(12) United States Patent
Nishihara (10) Patent No.: US 8,139,110 B2
(45) Date of Patent: Mar. 20, 2012

(54) CALIBRATION OF A GESTURE RECOGNITION INTERFACE SYSTEM

(75) Inventor: H Keith Nishihara, Los Altos, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1174 days.

(21) Appl. No.: 11/933,814

(22) Filed: Nov. 1, 2007

(65) Prior Publication Data

US 2009/0116742 A1    May 7, 2009

(51) Int. Cl.
*H04N 7/18*    (2006.01)
*G09G 5/00*    (2006.01)
*G06F 3/042*   (2006.01)
*G06K 9/00*    (2006.01)

(52) U.S. Cl. ......... 348/135; 382/154; 345/156; 345/175
(58) Field of Classification Search .................. None
See application file for complete search history.

(56) References Cited

U.S. PATENT DOCUMENTS

| | | |
|---|---|---|
| 4,468,694 A | 8/1984 | Edgar |
| 4,843,568 A | 6/1989 | Krueger et al. |
| 4,924,506 A | 5/1990 | Crossley et al. |
| 5,220,441 A | 6/1993 | Gerstenberger |
| 5,239,373 A | 8/1993 | Tang et al. |
| 5,475,422 A | 12/1995 | Mori et al. |
| 5,483,261 A | 1/1996 | Yasutake |
| 5,563,988 A | 10/1996 | Maes et al. |
| 5,913,727 A | 6/1999 | Ahdoot |
| 5,999,185 A | 12/1999 | Kato et al. |
| 6,002,808 A | 12/1999 | Freeman |
| 6,147,678 A | 11/2000 | Kumar et al. |

(Continued)

FOREIGN PATENT DOCUMENTS

DE    197 39 285 C1    11/1998

(Continued)

OTHER PUBLICATIONS

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.

(Continued)

*Primary Examiner* — Wen-Tai Lin
(74) *Attorney, Agent, or Firm* — Tarolli, Sundheim, Covell & Tummino LLP (57) ABSTRACT

One embodiment of the invention includes a gesture recognition interface system that determines input gestures based on changes in relative locations of an input object to initiate device inputs associated with the input gestures. The system comprises at least one light source positioned to illuminate a background surface in a first light spectrum to generate a light contrast difference between the input object and the background surface. The system also comprises a display device configured to display at least one calibration pattern on the background surface in a second light spectrum in response to a calibration command and at least one camera configured to receive images of the background surface in both the first light spectrum and the second light spectrum. The system further comprises an automated calibration component configured to issue the calibration command and to associate features of the at least one calibration pattern in the received images with known physical locations.

17 Claims, 4 Drawing Sheets

U.S. PATENT DOCUMENTS

| | | |
|---|---|---|
| 6,195,104 B1 | 2/2001 | Lyons |
| 6,204,852 B1 | 3/2001 | Kumar et al. |
| 6,222,465 B1 | 4/2001 | Kumar et al. |
| 6,327,381 B1 | 12/2001 | Rogina et al. |
| 6,353,428 B1 | 3/2002 | Maggioni et al. |
| 6,359,612 B1 | 3/2002 | Peter et al. |
| 6,434,255 B1 | 8/2002 | Harakawa |
| 6,512,507 B1 | 1/2003 | Furihata et al. |
| 6,681,031 B2 | 1/2004 | Cohen et al. |
| 6,695,770 B1 | 2/2004 | Choy et al. |
| 6,714,901 B1 | 3/2004 | Cotin et al. |
| 6,720,949 B1 | 4/2004 | Pryor et al. |
| 6,788,809 B1 | 9/2004 | Grzeszczuk et al. |
| 6,796,656 B1 | 9/2004 | Dadourian |
| 6,806,849 B2 | 10/2004 | Sullivan |
| 6,857,746 B2 | 2/2005 | Dyner |
| 6,950,534 B2 | 9/2005 | Cohen et al. |
| 6,956,573 B1 | 10/2005 | Bergen et al. |
| 6,983,065 B1 | 1/2006 | Akgul et al. |
| 7,259,747 B2 | 8/2007 | Bell |
| 7,701,439 B2 | 4/2010 | Hillis et al. |
| 2001/0006426 A1 | 7/2001 | Son et al. |
| 2001/0043719 A1 | 11/2001 | Harakawa et al. |
| 2002/0090146 A1 | 7/2002 | Heger et al. |
| 2002/0093666 A1* | 7/2002 | Foote et al. ............ 356/621 |
| 2002/0122113 A1 | 9/2002 | Foote |
| 2002/0126161 A1 | 9/2002 | Kuzunuki et al. |
| 2002/0186221 A1 | 12/2002 | Bell |
| 2003/0058341 A1 | 3/2003 | Brodsky et al. |
| 2003/0067537 A1 | 4/2003 | Myers |
| 2003/0085866 A1 | 5/2003 | Bimber |
| 2003/0156756 A1 | 8/2003 | Gokturk et al. |
| 2003/0218761 A1 | 11/2003 | Tomasi et al. |
| 2004/0046747 A1 | 3/2004 | Bustamante |
| 2004/0108990 A1 | 6/2004 | Lieberman et al. |
| 2004/0113885 A1 | 6/2004 | Genc et al. |
| 2004/0125207 A1 | 7/2004 | Mittal et al. |
| 2004/0183775 A1 | 9/2004 | Bell |
| 2004/0193413 A1 | 9/2004 | Wilson et al. |
| 2004/0239761 A1 | 12/2004 | Jin et al. |
| 2005/0002074 A1 | 1/2005 | McPheters et al. |
| 2005/0012817 A1 | 1/2005 | Hampapur et al. |
| 2005/0052714 A1 | 3/2005 | Klug et al. |
| 2005/0068537 A1 | 3/2005 | Han et al. |
| 2005/0088714 A1 | 4/2005 | Kremen |
| 2005/0110964 A1 | 5/2005 | Bell et al. |
| 2005/0151850 A1 | 7/2005 | Ahn et al. |
| 2005/0166163 A1 | 7/2005 | Chang et al. |
| 2005/0275628 A1 | 12/2005 | Balakrishnan et al. |
| 2005/0285945 A1 | 12/2005 | Usui et al. |
| 2005/0286101 A1 | 12/2005 | Garner et al. |
| 2006/0010400 A1* | 1/2006 | Dehlin et al. ............ 715/856 |
| 2006/0036944 A1 | 2/2006 | Wilson |
| 2006/0052953 A1 | 3/2006 | Vilanova et al. |
| 2006/0092178 A1 | 5/2006 | Tanguay |
| 2006/0125799 A1 | 6/2006 | Hillis et al. |
| 2006/0187196 A1 | 8/2006 | Underkoffler et al. |
| 2006/0203363 A1 | 9/2006 | Levy-Rosenthal |
| 2006/0209021 A1 | 9/2006 | Yoo et al. |
| 2007/0024590 A1 | 2/2007 | Krepec |
| 2007/0064092 A1 | 3/2007 | Sandbeg et al. |
| 2008/0013826 A1* | 1/2008 | Hillis et al. ............ 382/154 |
| 2008/0028325 A1 | 1/2008 | Ferren et al. |
| 2008/0043106 A1 | 2/2008 | Hassapis et al. |
| 2008/0150913 A1* | 6/2008 | Bell et al. ............ 345/175 |
| 2008/0244468 A1 | 10/2008 | Nishihara et al. |
| 2009/0015791 A1* | 1/2009 | Chang et al. ............ 353/6 |
| 2009/0103780 A1 | 4/2009 | Nishihara et al. |
| 2009/0135162 A1* | 5/2009 | Van De Wijdeven et al. 345/175 |
| 2009/0316952 A1 | 12/2009 | Ferren et al. |
| 2010/0050133 A1 | 2/2010 | Nishihara et al. |

FOREIGN PATENT DOCUMENTS

| | | |
|---|---|---|
| EP | 0 571 702 A2 | 12/1993 |
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2008/001202 A3 | 1/2008 |

OTHER PUBLICATIONS

British Search Report for corresponding GB 0909597.7 completed Sep. 17, 2009.

British Search Report for corresponding GB0910067.8, completed Oct. 15, 2009.

DE Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2716, completed Jun. 4, 2010, The Hague.

EP Search Report for corresponding EP 07 25 2870 completed Aug. 16, 2010 by Suphi Umut Naci of the Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2: p. 86, left-hand col., ¶4; p. 87, left-hand col., ¶4-right-hand col.

German Office Action for corresponding DE 10 2009 034 413.6-53, issued Sep. 29, 2010.

Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.

Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-D0I: 10.1109/ICSMC. 1993. 390870, vol.-, Oct. 17, 1993, pp. 324-328, XP010132504, ISBN: 978-0-7803-0911-1, pp. 325; figures 1-4.

Kjeldsen, et al.: "Toward the Use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.

Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse": IP.Com Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Rehg: "Visual Analysis of High DOF Articulated Objects with Application to Hand Tracking"; [online] 1995, XP002585209, School of Computer Science Carnegie Mellon University, Retrieved from the Internet: URL: http//www.dtoc/,o;/cgi-bin/GetTRDoc?AD=ADA3066778&Location=U2&doc=GetRDoc.pdf> [retrieved on May 25, 2010], p. 1, 28, 31.

Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Search Report for corresponding GB 0913330.7; Completed Nov. 3, 2009 by Dr. Russell Maurice.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

Vamossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

* cited by examiner

CALIBRATION OF A GESTURE RECOGNITION INTERFACE SYSTEM

TECHNICAL FIELD

The present invention relates generally to interface systems, and specifically to calibration of a gesture recognition interface system.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

Some interfaces can include imaging equipment to capture images that correspond to inputs. Such interfaces may include one or more cameras that can be registered to a display device in order to properly relate the position of inputs provided by an input device to positions of display content on the display device. Such interfaces typically require a manual calibration step that can be lengthy and can include additional equipment. As a result, such an interface can be expensive, and a setup time for the interface can be complicated and can require a high degree of precision. Furthermore, any change in the interface system (e.g., unintended bump) may require an additional manual calibration.

SUMMARY

One embodiment of the invention includes a gesture recognition interface system that determines input gestures based on changes in relative locations of an input object to initiate device inputs associated with the input gestures. The system comprises at least one light source positioned to illuminate a background surface in a first light spectrum to generate a light contrast difference between the input object and the background surface. The system also comprises a display device configured to display at least one calibration pattern on the background surface in a second light spectrum in response to a calibration command and at least one camera configured to receive images of the background surface in both the first light spectrum and the second light spectrum. The system further comprises an automated calibration component configured to issue the calibration command and to associate features of the at least one calibration pattern in the received images with known physical locations.

Another embodiment of the invention includes a method for calibrating a gesture recognition interface system. The method comprises providing at least one light source configured to illuminate a background surface in a first light spectrum to generate a reflected light contrast between an input object and the illuminated background surface and providing at least one camera configured to receive images of the illuminated background surface to a gesture recognition controller that determines input gestures based on the reflected light contrast. The at least one camera comprises a filter configured to pass a first amount of the first light spectrum and a second amount of a second light spectrum. The method also comprises confirming that the at least one light source is deactivated, adjusting an exposure of at least one camera, and displaying at least one calibration pattern on the background surface in the second light spectrum. The method further comprises associating features of the at least one calibration pattern with known physical locations based on the received images.

Another embodiment of the invention includes a gesture recognition interface system. The interface system comprises means for receiving images of a background surface and means for generating infrared (IR) illumination to provide a brightness contrast between the background surface and an input object. The system also comprises means for generating three-dimensional location information associated with the input object based on the received images and means for translating changes in the three-dimensional location information of the input object into a given input gesture. The system further comprises means for displaying at least one calibration pattern in visible light on the background surface and means for calibrating the means for generating the three-dimensional location information based on features of the at least one calibration pattern in the received images.

DETAILED DESCRIPTION

The present invention relates generally to interface systems, and specifically to calibration of a gesture recognition interface system. For a gesture recognition interface system, a user employs an input object to provide simulated inputs to a computer or other electronic device associated with the visible light images. It is to be understood that the simulated inputs are provided by gestures using the input object. For example, the user could provide gestures that include motion and/or contact with a background surface using the input object. The input object could be, for example, the user's hand; a wand, stylus, pointing stick; or a variety of other devices with which the user can gesture. The simulated inputs could be, for example, simulated mouse inputs.

At least one light source illuminates the input object and the background surface behind the input object in a first light spectrum to generate a plurality of images of the input object that are captured by at least one camera. The first light spectrum can be non-visible light, such as infrared (IR) light. As an example, the at least one camera can include a pair of stereo cameras. As such, the plurality of images of the input object could be a plurality of matched pairs of images of the input object, such that each image of the matched pair corresponds to the input object from a different perspective at substantially the same time. The plurality of images can be employed to determine a three-dimensional location of the input object, with changes in the location being employed to determine physical motion of the input object.

A controller can be operative to receive the plurality of images to determine the three-dimensional location information associated with the input object. The controller could then translate the simulated inputs into device inputs based on the three-dimensional location information. For example, the controller could interpret gesture inputs based on motion associated with the one or more end-points of the input object and translate the gesture inputs into inputs to a computer or other device. The controller could also compare the motion associated with the input object with a plurality of predefined gestures stored in a memory, such that a match with a given predefined gesture could correspond to a particular device input.

For accurate operation of the gesture recognition system, the gesture recognition system can be calibrated prior to operation, such that the gesture recognition system can accurately detect the location of the input object during normal operation. As described herein, the gesture recognition system can be calibrated in an automated manner, such that lengthy and specific manual calibration can be avoided. To calibrate the gesture recognition system, upon entering a calibration mode, the light sources can be deactivated, and a second light spectrum can be shined onto the background surface. The second light spectrum can be, for example, visible light, such that visible white light can be shined onto the background surface. The at least one camera can include a filter that not only permits passage of the first light spectrum, but also permits passage of a small amount of visible light. The at least one camera can thus adjust its exposure to increase the amount of white light that is passed. A calibration pattern can then be displayed in the visible light spectrum on the background surface. The controller can thus associate the features of the calibration pattern with known physical locations, such as based on parallax separation of the features of the calibration pattern. The calibration pattern can include separate calibration patterns, such as to define projection boundaries and to associate physical locations of the features. The light sources can thus be reactivated and the at least one camera exposure can be readjusted, such that the gesture recognition system can be ready to receive and translate simulated inputs.

Figure 1:
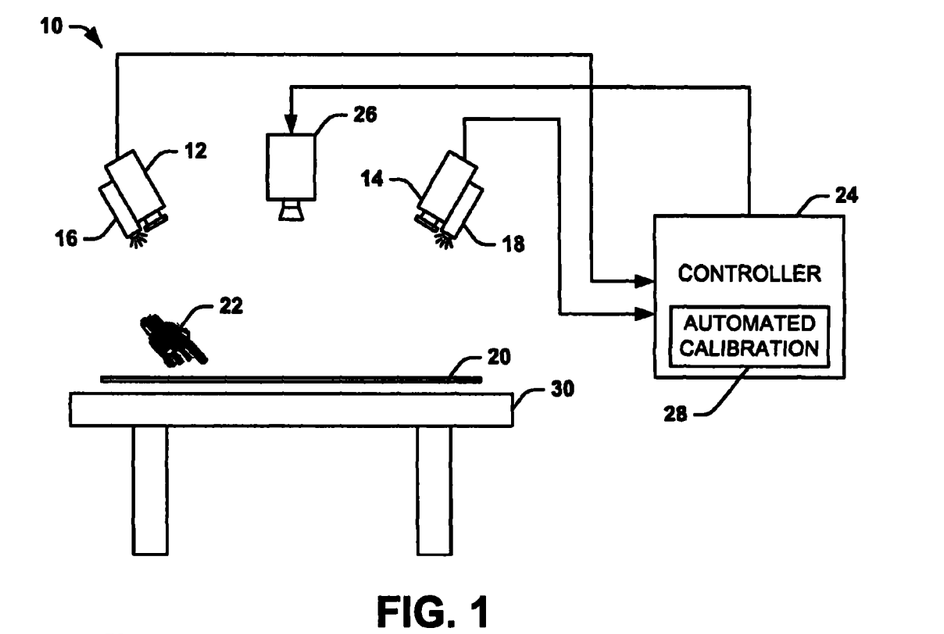
FIG. 1 illustrates an example of a gesture recognition interface system in accordance with an aspect of the invention.

FIG. 1 illustrates an example of a gesture recognition interface system 10 in accordance with an aspect of the invention. The gesture recognition interface system 10 includes a first camera 12 and a second camera 14. Coupled to each of the first camera 12 and the second camera 14, respectively, is a first IR light source 16 and a second IR light source 18. The first camera 12 and the second camera 14 may each include an IR filter, such that the respective camera may pass IR light and substantially filter other light spectrums. However, as described below, the IR filters of the first camera 12 and the second camera 14 may also be configured to receive a small amount of the visible light spectrum relative to the IR spectrum during a calibration procedure, as explained below.

The first IR light source 16 and the second IR light source 18 each illuminate a background surface 20 which can be retroreflective. As such, IR light from the first IR light source 16 can be reflected substantially directly back to the first camera 12 and IR light from the second IR light source 18 can be reflected substantially directly back to the second camera 14. Accordingly, an object that is placed above the background surface 20 may reflect a significantly lesser amount of IR light back to each of the first camera 12 and the second camera 14, respectively. Therefore, such an object can appear to each of the first camera 12 and the second camera 14 as a silhouette image, such that it can appear as a substantially darker object in the foreground of a highly illuminated background surface. It is to be understood that the background surface 20 may not be completely retroreflective, but may include a Lambertian factor to facilitate viewing by users at various angles relative to the background surface 20.

An input object 22 can provide simulated inputs over the background surface 20. In the example of FIG. 1, the input object 22 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of input objects could include a stylus, wand, pointing stick, or any of a variety of devices that could provide gestures to simulate inputs. It is to be further understood that the input object 22 can be sensorless, in that it need not be specially designed or suited for use in the gesture recognition interface system 10. For example, a user's naked hand could be used as the input object, and thus a user need not wear a glove that includes retroreflective material or one or more position sensors to provide gesture inputs to the gesture recognition interface system 10 in accordance with an aspect of the invention.

In the example of FIG. 1, the first camera 12 and the second camera 14 each receive separate silhouette images of the input object 22, where each of the separate silhouette images received, respectively, by the first camera 12 and the second camera 14 are a matched pair. For example, each of the first camera 12 and the second camera 14 could rapidly take still photograph images at, for example, sixty times per second, such that each still photograph image taken by the first camera 12 is matched to a still photograph image taken by the second camera 14 at substantially the same time. The input object can appear to be in a different location relative to the retroreflective screen in each silhouette image matched pair captured by each of the first camera 12 and the second camera 14, respectively, due to parallax caused by the different mounted locations of each of the first camera 12 and the second camera 14.

The first camera 12 and the second camera 14 can each provide their respective separate silhouette images of the input object 22 to a controller 24. The controller 24 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 24 can process the respective silhouette images associated with the input object 22 to generate three-dimensional location data associated with the input object 22.

For example, each of the first camera 12 and the second camera 14 could be mounted at a pre-determined angle relative to the background surface 20. For a given matched pair of images of the input object 22, if the pre-determined angle of each of the cameras 12 and 14 is equal, then each point of the input object 22 in two-dimensional space in a given image from the camera 12 is equidistant from a corresponding point of the input object 22 in the respective matched image from the camera 14. As such, the controller 24 could determine the three-dimensional physical location of the input object 22 based on a relative parallax separation of the matched pair of images of the input object 22 at a given time. In addition, using a computer algorithm, the controller 24 could also determine the three-dimensional physical location of at least one end-point, such as a fingertip, associated with the input object 22.

The gesture recognition interface system 10 can also include a projector 26 configured to project image data. The projector 26 can provide an output interface, such as, for example, computer monitor data, for which the user can interact and provide inputs using the input object 22. In the example of FIG. 1, the projector 26 can project the image data onto the background surface 20. Because the IR light sources 16 and 18 do not illuminate visible light, the IR illumination does not interfere with the image data projected from the projector 26. The user can thus employ the input object 22 directly onto the image data to simulate inputs, such as, for example, mouse inputs.

In the example of FIG. 1, the controller 24 includes an automated calibration component 28. The automated calibration component 28 can be configured, such as in response to a manual input, to begin a calibration procedure, such that the controller 24 can be calibrated to accurately calculate the three-dimensional physical location of the input object 22. As an example, upon the initiation of a calibration procedure, the automated calibration component 28 can deactivate the first IR light source 16 and the second IR light source 18. In addition, at the beginning of the calibration procedure, the projector 26 can project visible white light onto the background surface 20.

Figure 2:
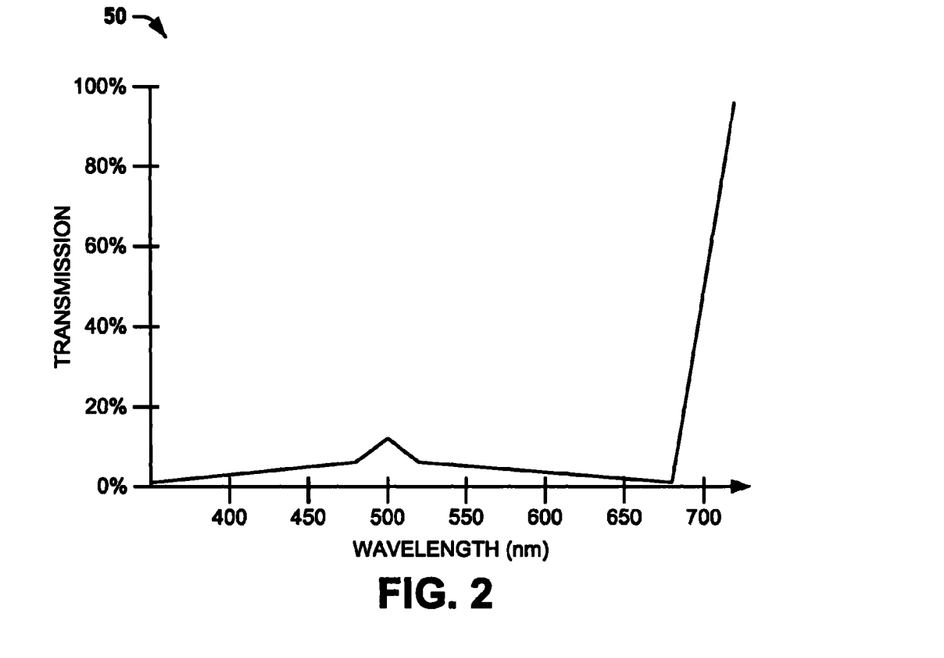
FIG. 2 illustrates an example of a graph of filter performance of a camera in a gesture recognition interface system in accordance with an aspect of the invention.

As described above, the first and second camera 12 and 14 can include IR filters that can be configured to pass a relatively small amount of visible light. FIG. 2 illustrates an example of a graph 50 of filter performance of the first camera 12 and the second camera 14 of the gesture recognition interface system 10 in accordance with an aspect of the invention. Specifically, the graph 50 illustrates a plot of wavelength of light in nanometers versus percentage of transmission, such that higher percentages indicate greater amounts of light passed for a given wavelength.

The graph 50 demonstrates that, at higher wavelengths (e.g., beginning at approximately 680 nm), the filter passes a substantial amount of the light. As a result, IR light (e.g., around approximately 850 nm) is substantially completely passed by the filter. In addition, as demonstrated in the example of FIG. 2, the filter is also configured to pass a relatively small amount of the visible light spectrum, from approximately 360 nm to approximately 670 nm. In the example of FIG. 2, the graph 50 demonstrates a small peak at approximately 500 nm. It is to be understood that the graph 50 in the example of FIG. 2 is demonstrated as an ideal plot, such that it demonstrates a very linear performance across the demonstrated ranges of wavelength. As such, the plot of wavelength versus transmission percentage for a given filter to be used with the gesture recognition interface system 10 is likely to include non-linear variations, particularly from one filter to another.

A filter configured to provide the performance demonstrated by the graph 50 can typically be commercially available at a price that can be significantly cheaper than one that is configured to pass substantially nothing but IR light. As a result, by implementing a filter such as described by the graph 50 in the example of FIG. 2, and such that it is capable of implementing a small amount of visible light in the performance of a calibration procedure, as described below, substantial cost-savings can be achieved for the gesture recognition interface system 10. Furthermore, because the filter is designed to pass substantially greater IR light than visible light, the illumination of IR light from the IR light sources 16 and 18 onto the retroreflective background surface 20 ensures that very little content of the image data projected from the projector 26 is received by the first and second cameras 12 and 14. As a result, the projected image data in the visible spectrum does not affect the images of the IR light contrast between the input object 22 and the background surface 20 with respect to gesture recognition.

Referring back to FIG. 1, upon projecting visible white light onto the background surface 20, the automated calibration component 28 can command the first and second cameras 12 and 14 to increase their respective exposure. As described herein, changes in exposure can include changes in exposure time (i.e., image detection integration time), camera aperture opening, and/or camera amplifier gain. As a result, the amount of visible white light provided to the first and second cameras 12 and 14 via reflection from the background surface 20 is increased. The automated calibration component 28 then commands the controller 24 to project a calibration pattern onto the background surface 20 in the visible light spectrum. The calibration pattern can include defined features in the visible light spectrum, such as lines, dots, squares, and/or any of a variety of features that are non-uniform across the entirety of the projection of the calibration pattern. As such, the first and second cameras 12 and 14 can capture images of the defined features and the controller 24 can ascertain a reflected light contrast between the features of the calibration pattern and the visible white light. The controller 24 can thus determine a location of the features of the calibration pattern based on parallax separation, similar to determining the location of the input object 22. Because the controller 24 identifies that the calibration pattern features are located directly on the background surface 20, the controller 24 can associate the locations of the features with known physical locations in two-dimensional space. Accordingly, the controller 24 is calibrated, such that it can subsequently extrapolate the location of the input object 22 in three-dimensional space.

As an example, the controller 24 can be commanded to provide a first calibration pattern that defines a projection boundary of the projector 26 relative to the background surface 20. Such a calibration pattern could include horizontal and vertical lines that are projected toward the edge of the projection area of the projector 26. Therefore, the controller 24 can determine the presence of the lines and thus indicate that the lines are projected onto the background surface 20, as opposed to the projection being skewed, such as by being projected off one or more edges of the background surface 20.

Figure 3:
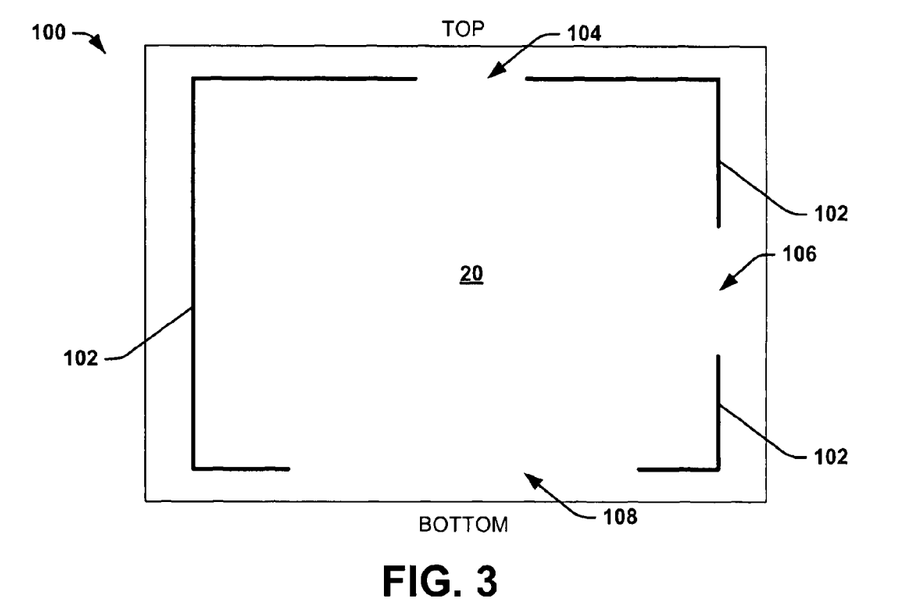
FIG. 3 illustrates an example of a calibration pattern for a gesture recognition interface system in accordance with an aspect of the invention.

FIG. 3 illustrates an example of a calibration pattern 100 for the gesture recognition interface system 10 in accordance with an aspect of the invention. The calibration pattern 100 includes a non-continuous border 102 that can be located near the edges of the projection area of the projector 26, and also includes a first gap 104, a second gap 106, and a third gap 108. The non-continuous border 102 can be projected in any of a variety of colors. As an example, the non-continuous border 102 can be black, such that it contrasts significantly relative to the visible white light of the background surface 20. As another example, the non-continuous border 102 can be projected in a color that is more easily passed by the filter of the first and second cameras 12 and 14, such as based on the approximately 500 nm peak (i.e., green) in the example of FIG. 2.

The calibration pattern is projected onto the background surface 20 in the viewing area of the first and second cameras 12 and 14 by the projector 26 in the visible light spectrum. As an example, the longer side of the non-continuous border 102 with the first gap 104 can be designated a top side, as indicated in the example of FIG. 3, such that the shorter side of the non-continuous border 102 with no gap is a left side. The non-continuous border 102 can be used to set a boundary for the projector 26. For example, the controller 24 can receive the images of the calibration pattern 100 via the first and second cameras 12 and 14 to attempt to identify the four sides of the non-continuous border 102. If one of the edges of the border 102 is missing, such as based on being projected off the edge of the background surface, the controller 24 can adjust the projection of the calibration pattern 100.

As an example, the projection of the calibration pattern 100 can be zoomed, shifted, and/or otherwise adjusted until the controller 24 can identify each side of the non-continuous border 102. As another example, the projector 26 or the background surface 20 can be moved, such as based on servo control, until the controller 24 can identify each side of the non-continuous border 102. As yet another example, the controller 24 can change the calibration pattern 100, such as by shortening a side of the non-continuous border 102 until the controller 24 can identify each side of the non-continuous border 102. Therefore, upon properly identifying each side of the non-continuous border 102, the automated calibration component 28 and/or the controller 24 can be programmed to recognize the non-continuous border 102 and to identify the orientation of the non-continuous border 102 via the first, second, and third gaps 104, 106, and 108. As a result, the controller 24 can be calibrated to properly identify a two-dimensional X-Y coordinate location on the background surface 20.

Figure 4:
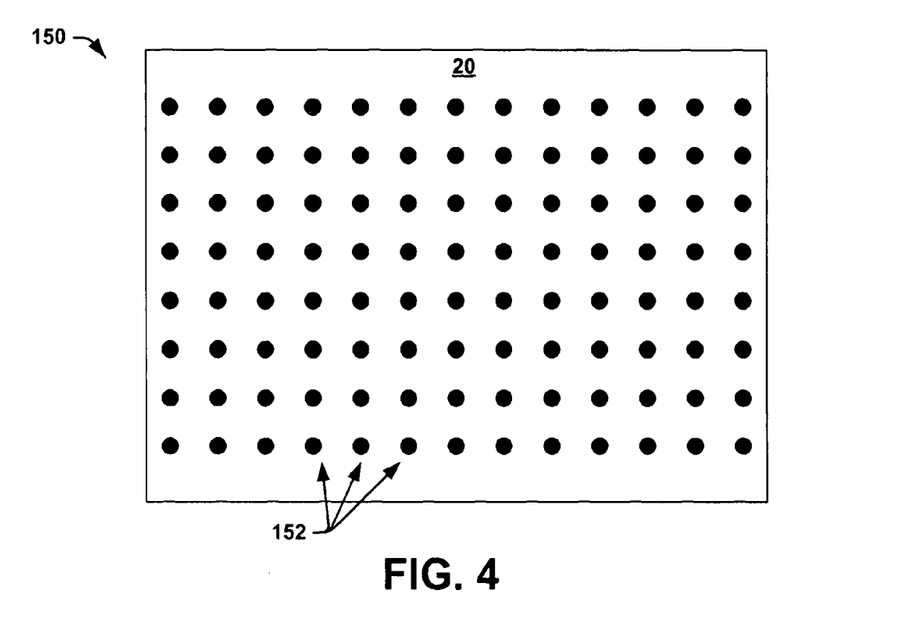
FIG. 4 illustrates another example of a calibration pattern for a gesture recognition interface system in accordance with an aspect of the invention.

Upon defining the projection boundaries, the controller 24 can then be commanded to provide a second calibration pattern that is used to associate the features of the second calibration pattern with known physical locations in two-dimensional space. As an example, FIG. 4 illustrates another example of a calibration pattern 150 for a gesture recognition interface system in accordance with an aspect of the invention. The calibration pattern 150 includes a repeated pattern of features that contrast with the background surface 20, demonstrated in the example of FIG. 4 as a plurality of black dots 152. As an example, the black dots 152 can be sized to be approximately the size of a fingertip in diameter (e.g., ½"), and can thus be tuned by the automated calibration component 28 to be detected.

The automated calibration component 28 calibrates the controller 24 by detecting the position of the black dots 152 via the first camera 12 relative to the second camera 14. Specifically, the controller 24 determines a parallax separation between the black dots 152 in the images received from the first camera 12 and the images received from the second camera 14. By identifying the parallax separation of the black dots 152 relative to a zero-height location of the black dots 152 based on their projection onto the background surface 20, the controller 24 can thus calculate a calibrated location of the background surface 20. Therefore, subsequent to calibration, the controller 24 can extrapolate a three-dimensional physical location of the input object 22 in the viewing area of the first camera 12 and the second camera 14 relative to the height of the background surface 20.

It is to be understood that neither the calibration pattern 100 nor the calibration pattern 150 are intended to be limited by the respective examples of FIGS. 3 and 4. As an example, although the calibration pattern 100 is illustrated as a non-continuous border, the calibration pattern 100 can be continuous, such that orientation is not based on the first, second, and third gaps 104, 106, and 108, or is not necessary. As another example, the calibration pattern 100 can include non-intersecting line segments at each edge, with each line segment being individually and/or sequentially moved from the outer projection edge inward in a frame-by-frame manner until identified by the controller. As yet another example, the calibration pattern 150 need not be a series of black dots 152, but could be any of a variety of patterns that has distinct and clearly ascertainable features for identification by the automated calibration component 28. As a further example, the automated calibration component 28 can command the controller 24 to project a single calibration pattern that incorporates the features of the calibration pattern 100 and the calibration pattern 150. As a result, the single calibration pattern can be implemented to both define the projection boundaries relative to the background surface and to associate the features with the two-dimensional physical locations.

Upon completion of the calibration procedure based on the projection of the one or more calibration patterns, the automated calibration component 28 can reactivate the first and second IR light sources 16 and 18. In addition, the automated calibration component 28 can decrease the exposure of the first and second cameras 12 and 14 to the amount at which the first and second cameras 12 and 14 were set prior to the calibration procedure. As a result, the exposure of the first and second cameras 12 and 14 can be set to receive the IR light that is provided by the first and second IR light sources 16 and 18 and reflected from the background surface 20. Accordingly, the gesture recognition interface system 10 is ready to receive and translate simulated inputs via the input object 22.

The gesture recognition interface system 10 in the example of FIG. 1 is intended to represent but one example of a gesture recognition interface system in accordance with an aspect of the invention. For example, the gesture recognition interface system 10 could include more than two cameras that each supply respective silhouette images of the input object 22 to the controller 24. In addition, the example of FIG. 1 demonstrates that the background surface 20 is mounted on a table 30. It is to be understood that such an arrangement is demonstrated only for the sake of ergonomic concerns, but that the background surface 20 can be placed in a variety of different arrangements for each of the cameras 12 and 14 to be capable of receiving the respective silhouette images of the input object 22. In addition, as another example, the table 30 could mount the projector 26 underneath, such that the background surface 20 displays rear-projected image data. Furthermore, the light sources 16 and 18 are not limited to IR light sources, and the projection of the calibration pattern, such as calibration patterns 100 and 150, is not limited to visible light. Therefore, other light spectrums could be provided from the light sources 16 and 18, and/or the calibration pattern can be projected in a different, non-visible light spectrum.

As yet another example, the gesture recognition interface system 10 may not include a projector at all. Instead, the background surface 20 could be a liquid crystal display (LCD) screen. As a result, the image data and the calibration pattern could be displayed on the background surface 20 as an LCD image, and not a projected image. Accordingly, gesture inputs can be simulated above it, similar to as described above. For example, the silhouette images can be based on a light contrast of IR light reflected from the input object relative to a substantially less reflective background surface 20 that is the LCD screen. In addition, the calibration pattern(s) can still be displayed in the visible light spectrum upon deactivation of the IR light sources, as described above. Accordingly, the gesture recognition interface system 10 can be configured in any of a variety of ways.

Figure 5:
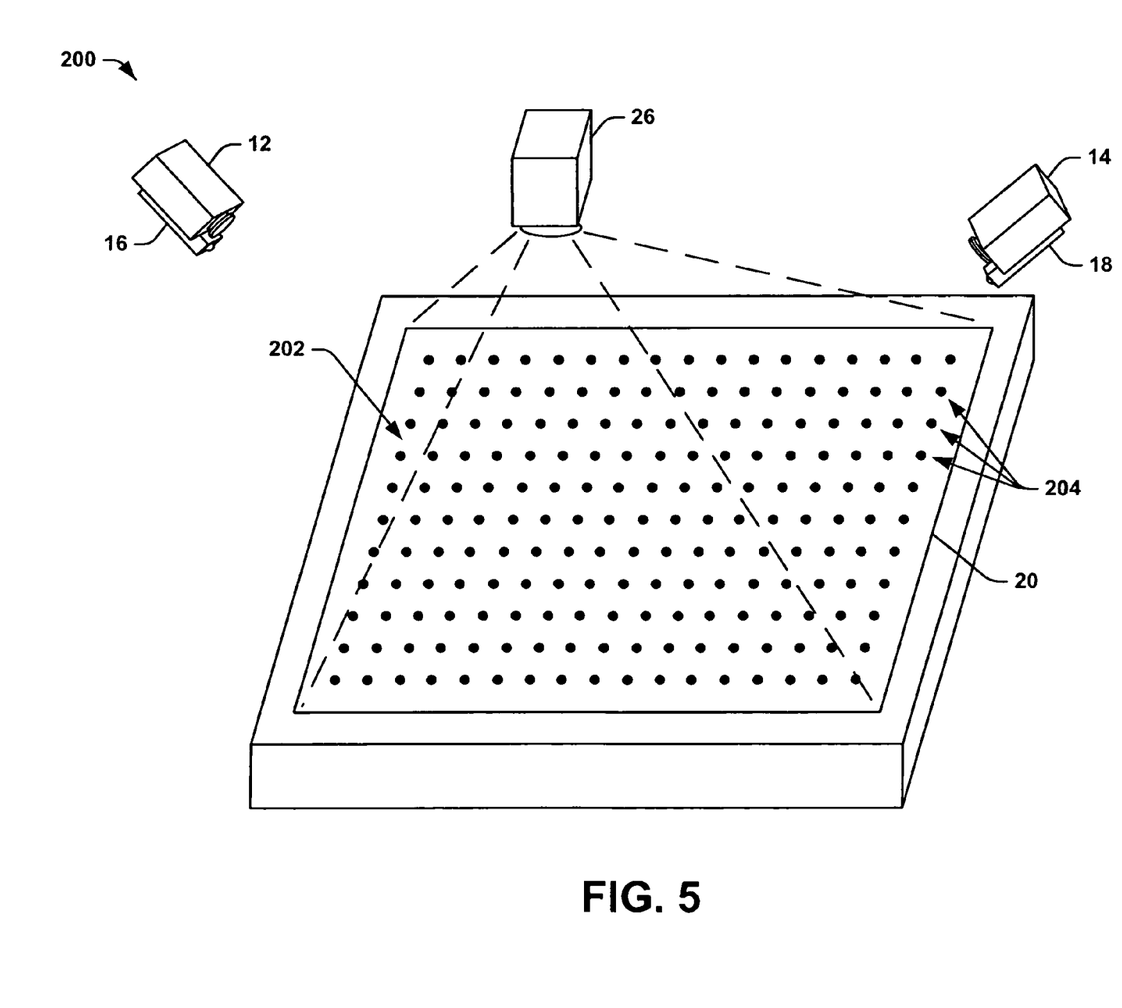
FIG. 5 illustrates an example of a calibration procedure in accordance with an aspect of the invention.

FIG. 5 illustrates an example of a calibration procedure 200 in accordance with an aspect of the invention. The calibration procedure 200 can be implemented in the gesture recognition interface system 10 in the example of FIG. 1. As such, reference is to be made to the example of FIG. 1 in the following discussion of the example of FIG. 5.

The calibration procedure 200 demonstrates an overhead view of the projector 26 projecting a predefined calibration pattern 202 onto the background surface 20. The projection of the predefined calibration pattern 202 can be performed during a calibration procedure, such as in response to a manual input. As a result, the predefined calibration pattern 202 can be projected in the visible light spectrum to users of the gesture recognition interface system 10 as it is being projected onto the background surface 20 after deactivation of the IR light sources 16 and 18. In the example of FIG. 5, it is to be assumed that the projection boundaries of the projector 26 relative to the background surface 20 have already been defined.

In the example of FIG. 5, the predefined calibration pattern 202 is demonstrated as a plurality of equally spaced dots 204. It is to be understood, however, that the predefined calibration pattern 202 is not limited to the dots 204 demonstrated in the example of FIG. 5, but that any distinct and identifiable pattern may be implemented in the calibration procedure 200. The first and second cameras 12 and 14 can each capture images of the projected predefined calibration pattern and provide the images to the controller 24 (not shown in the example of FIG. 5). The physical location of each of the dots 204 of the predefined calibration pattern can thus be specifically identified by the controller 24. As an example, the controller 24 can identify the location of each of the dots 204 based on a parallax separation of the dots 204 in the images received from the camera 12 relative to the dots 204 in the images received from the camera 14.

The controller 24 can thus correlate the location of the features of the predefined calibration pattern 202 appearing in the images of the cameras 12 and 14 with the precise physical locations on the background surface 20. As a result, the controller 24 can extrapolate three-dimensional locations of the input object 22 based on the calibration information that is calculated based on the physical locations of the dots 204 on the background surface 20. Accordingly, calibration of the gesture recognition interface system 10 is achieved.

Figure 6:
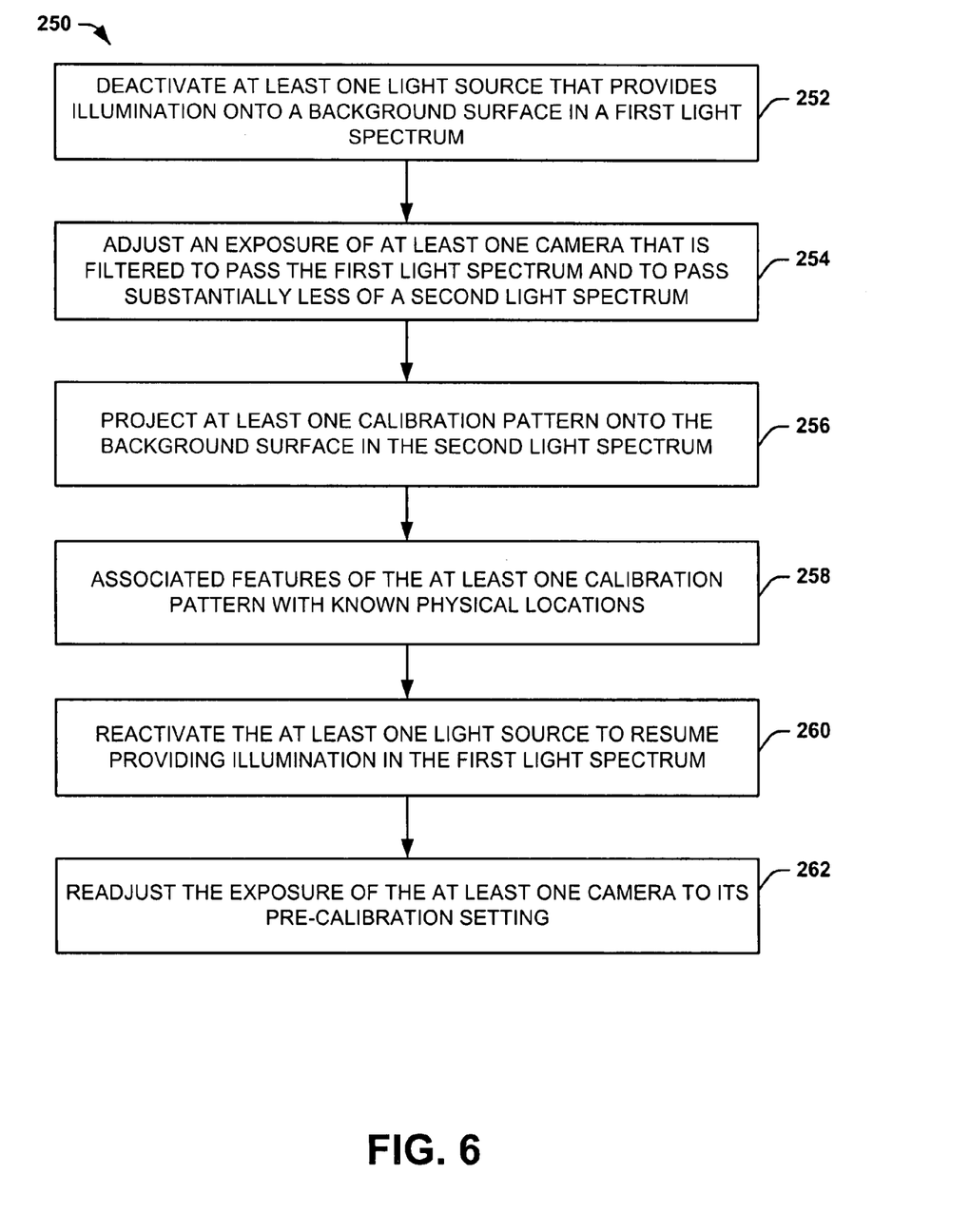
FIG. 6 illustrates an example of a method for calibrating a gesture recognition interface system in accordance with an aspect of the invention.

In view of the foregoing structural and functional features described above, a methodology in accordance with various aspects of the present invention will be better appreciated with reference to FIG. 6. While, for purposes of simplicity of explanation, the methodologies of FIG. 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for calibrating a gesture recognition interface system in accordance with an aspect of the invention. At 252, at least one light source is confirmed to be deactivated, the light source providing illumination onto a background surface in a first light spectrum. The illumination can be provided onto the background surface to generate a reflected light contrast between an input object and the illuminated background surface. The first light spectrum can be IR light, and the background surface could be retroreflective. The background surface could also be an output display, such that it displays image data such as computer monitor data. At 254, an exposure is adjusted for at least one camera that is filtered to pass the first light spectrum and substantially less of a second light spectrum. The adjustment can be to increase the exposure. The at least one camera can be configured to provide a plurality of images of the reflected light contrast between the input object and the illuminated background surface to a gesture recognition controller. The at least one camera can be collocated with the respective at least one light source, such that the retroreflectivity of the background surface provides more light to be reflected to the respective camera.

At 256, at least one calibration pattern is projected onto the background surface in the second light spectrum. The second light spectrum can be visible light. At 258, features of the at least one calibration pattern are associated with known physical locations. The at least one calibration pattern can include a first calibration pattern with features that define the projection boundaries of a projector that projects the calibration pattern relative to the background surface. The at least one calibration pattern can also include a second calibration pattern with features that are associated with the known physical locations in two-dimensional space on the background surface. The association can occur based on a parallax separation of the features in images received at each of multiple stereo cameras.

At 260, the at least one light source can be reactivated to resume providing illumination in the first light spectrum. At 262, the exposure of the at least one camera is readjusted to its pre-calibration setting. The readjustment can be to decrease the exposure. Based on the intensity of the at least one light source and the passing of substantially more of the first light spectrum, the cameras can receive clear images that are substantially unaffected by image data that is projected in the second light spectrum. As a result, images of a reflected light contrast between an input object and the background surface can be provided to the gesture recognition controller. Based on the calibration procedure, a parallax separation of the images can be used to extrapolate a three-dimensional physical location of the input object. Therefore, gesture inputs can be simulated and translated into device inputs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition interface system that determines input gestures based on changes in relative locations of an input object to initiate device inputs associated with the input gestures, the system comprising:

at least one light source positioned to illuminate a background surface in a first light spectrum to generate a light contrast difference between the input object and the background surface;

a display device configured to display at least one calibration pattern on the background surface in a second light spectrum in response to a calibration command;

at least one camera configured to receive images of the background surface in both the first light spectrum and the second light spectrum, the at least one camera comprising a filter configured to pass a first amount of the first light spectrum and a second amount of the second light spectrum, the first amount being substantially greater than the second amount; and an automated calibration component configured to issue the calibration command to initiate a calibration procedure, the automated calibration component being further configured to adjust an exposure of the at least one camera to increase a light contrast between the features of the at least one calibration pattern and the background surface and to associate features of the at least one calibration pattern in the received images with known physical locations during the calibration procedure.

2. The system of claim 1, wherein the first light spectrum is non-visible light and the second light spectrum is visible light.

3. The system of claim 2, wherein the first light spectrum is infrared (IR) light.

4. The system of claim 1, wherein the automated calibration component is further configured to deactivate the at least one light source upon displaying the at least one calibration pattern on the background surface.

5. The system of claim 1, wherein the at least one calibration pattern comprises a first calibration pattern and a second calibration pattern, the display device being configured to display the first calibration pattern to define a display area associated with the background surface and to display the second calibration pattern subsequent to displaying the first calibration pattern to associate the relative locations of the input object with known physical locations in three-dimensional space.

6. The system of claim 1, wherein the display device is further configured to display image data with which the input object interacts on the background surface subsequent to a calibration procedure.

7. The system of claim 1, wherein the background surface is retroreflective, and wherein each of the at least one light source is substantially collocated with each of the respective at least one camera.

8. The system of claim 1, wherein the at least one camera comprises a plurality of cameras, the automated calibration component being configured to associate the at least one calibration pattern with the known physical locations based on a parallax separation of a respective plurality of images of the features of the at least one calibration pattern.

9. A method for calibrating a gesture recognition interface system, the method comprising:
providing at least one light source configured to illuminate a background surface in a first light spectrum to generate a reflected light contrast between an input object and the illuminated background surface;
providing at least one camera configured to receive images of the illuminated background surface and provide the images to a gesture recognition controller that determines input gestures based on the reflected light contrast, the at least one camera comprising a filter configured to pass a first amount of the first light spectrum and a second amount of a second light spectrum;
confirming that the at least one light source is deactivated;
adjusting an exposure of at least one of the at least one camera;
displaying at least one calibration pattern on the background surface in the second light spectrum; and
associating features of the at least one calibration pattern with known physical locations based on the received images based on reflection of the second light spectrum from the background surface and the adjusted exposure of the at least one of the at least one camera.

10. The method of claim 9, wherein the first light spectrum is infrared (IR) light and the second light spectrum is visible light.

11. The method of claim 9, further comprising:
reactivating the at least one light source subsequent to a calibration procedure;
simulating inputs over the background surface using the input object; and
translating the simulated inputs into device inputs based on the received images.

12. The method of claim 11, further comprising displaying image data with which the input object interacts on the background surface upon reactivating the at least one light source.

13. The method of claim 9, wherein displaying the at least one calibration pattern comprises:
displaying a first calibration pattern to define a display area associated with the background surface; and
displaying a second calibration pattern to associate the relative locations of the input object with known physical locations in three-dimensional space.

14. The method of claim 9, wherein the at least one camera comprises a plurality of cameras, and wherein associating the features of the at least one calibration pattern comprises:
determining a parallax separation of concurrent received images of the features of the at least one calibration pattern; and
calculating a two-dimensional location of the features of the at least one calibration pattern based on the parallax separation of the concurrent received images.

15. A gesture recognition interface system comprising:
means for receiving images of a background surface in both IR illumination and visible light, the means for receiving images comprising means for passing a first amount of the IR illumination and a second amount of the visible light, the first amount being substantially greater than the second amount;
means for generating infrared (IR) illumination to provide a brightness contrast between the background surface and an input object;
means for generating three-dimensional location information associated with the input object based on the received images, and for translating changes in the three-dimensional location information of the input object into a given input gesture;
means for displaying at least one calibration pattern in visible light on the background surface; and
means for calibrating the means for generating the three-dimensional location information based on features of the at least one calibration pattern in the received images, the means for calibrating being configured to adjust an exposure of the means for receiving images to increase a light contrast between the features of the at least one calibration pattern and the background surface.

16. The system of claim 15, wherein the means for receiving images concurrently receives first images and second images, and wherein the means for calibrating is configured to calibrate based on a parallax separation of the features of the at least one calibration pattern in the first images relative to the second images.

17. The system of claim 15, wherein the means for displaying the at least one calibration pattern is further configured to display image data with which the input object interacts on the background surface.

* * * * *